US008684435B1

(12) United States Patent
Lee

(10) Patent No.: US 8,684,435 B1
(45) Date of Patent: Apr. 1, 2014

(54) STRUCTURE OF INNER-HANDLE FOR TAILGATE

(71) Applicant: Hyundai Motor Company, Seoul (KR)

(72) Inventor: Ho-Sang Lee, Incheon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/724,728

(22) Filed: Dec. 21, 2012

(30) Foreign Application Priority Data

Oct. 5, 2012 (KR) ........................ 10-2012-0110545

(51) Int. Cl.
*B60J 5/10* (2006.01)

(52) U.S. Cl.
USPC ........................ 296/1.02; 16/110.1; 296/146.8

(58) Field of Classification Search
USPC .................. 296/146.8, 146.9, 56, 146.1, 106, 296/180.5, 51, 1.02, 146.2, 71, 76; 16/412, 16/110.1
See application file for complete search history.

(56) References Cited

FOREIGN PATENT DOCUMENTS

| | | |
|---|---|---|
| KR | 10-2005-0059804 A | 6/2005 |
| KR | 10-2007-0013741 A | 1/2007 |

*Primary Examiner* — Joseph Pape
*Assistant Examiner* — Dana Ivey
(74) *Attorney, Agent, or Firm* — Morgan, Lewis & Bockius LLP

(57) ABSTRACT

A tailgate inner-handle is vertically rotatably mounted and includes: cylinders having sliding holes formed in outer circumferential surfaces along a longitudinal direction; pistons inserted in the cylinders and having fitting holes; a handle mounted at one end of the piston; a carrying bar entering the cylinders through the sliding holes to be inserted in the fitting holes; a motor connected so as to slide the carrying bar; and a control module configured to apply power to the motor according to whether the tailgate is opened or closed. The inner-handle according to the present invention protrudes from the tailgate or returns to an original position according to an opening/closing state of the tailgate, so that a user may more easily and conveniently hold the inner-handle regardless of a height of the user without needing to adjust an opening angle of the tailgate.

6 Claims, 9 Drawing Sheets

STRUCTURE OF INNER-HANDLE FOR TAILGATE

CROSS-REFERENCE TO RELATED APPLICATIONS

The present application claims priority of Korean Patent Application Number 10-2012-110545 filed Oct. 5, 2012, the entire contents of which application is incorporated herein for all purposes by this reference.

BACKGROUND OF INVENTION

1. Field of Invention

The present invention relates to a structure of an inner-handle for a tailgate, and more particularly, to a structure of an inner-handle for a tailgate which a short person can more easily hold without decreasing an opening height of the tailgate.

2. Description of Related Art

An SUV or MPV vehicle in which a tailgate is installed includes an opening at a rear side of a vehicle body so as to easily load a product, and the tailgate is configured to open/close the opening that is an entrance of the loading space.

As illustrated in FIG. 1A, the tailgate vertically rotatably mounted at the rear side of the vehicle body to open/close the opening is provided with an inner-handle at an inside lower end for convenience of a user when the tailgate is opened upwardly and then is closed.

The inner-handle is classified into a trim integrated type, a panel insertion type, a grip type, and the like, and is selectively mounted in the tailgate according to the kind of vehicle or specifications of a vehicle.

In the meantime, as illustrated in FIG. 1A, the inner-handle is inconvenient for a short person, especially, a woman, for use because a position of the inner-handle is high when the tailgate is opened.

Such inconvenience may be resolved by decreasing an opening angle of the tailgate. However, if the opening angle is decreased, relatively tall people may hit their heads against the tailgate as illustrated in FIG. 1B, and it may be inconvenient to load and unload products.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

In order to solve the problem, as illustrated in FIG. 1C, an auxiliary ring is mounted by selectively suspending a string or a cable from an interior side of the tailgate according to a necessity so as to enable a user to pull the auxiliary ring when the user closes the tailgate.

However, the auxiliary ring with the suspended string or cable has a problem of degrading the appearance when the tailgate is opened and causes inconvenience when products are loaded and unloaded.

Therefore, Various aspects of the present invention provide for a structure of an inner-handle for a tailgate which a user may more easily hold regardless of a height even without additionally mounting an auxiliary ring and adjusting an opening angle of the tailgate.

Various aspects of the present invention provide for an inner-handle for a tailgate vertically rotatably mounted at a rear side of a vehicle body, including: cylinders having sliding holes formed in outer circumferential surfaces along a longitudinal direction; pistons inserted in the cylinders and having fitting holes; a handle mounted at one end of the piston; a carrying bar entering the cylinders through the sliding holes to be inserted in the fitting holes; a motor connected so as to slide the carrying bar; and a control module configured to apply power to the motor according to whether the tailgate is opened or closed.

The piston and the cylinder may make a pair, two pairs of pistons and cylinders may be arranged in parallel so as to be connected to one side and the other side of the handle, respectively, and the carrying bar may be mounted between the two pairs of pistons and cylinders so that one end of the carrying bar and the other end of the carrying bar are connected to the pairs of pistons and cylinders, respectively.

The inner-handle may further include springs inserted in the cylinders to apply elastic force in a direction in which the pistons protrude outwardly from the cylinders, in which the motor is connected with the carrying bar through a wire which is wounded around a pulley and of which one end is bound to the carrying bar, so that the piston protrudes from the cylinder by elastic force of the spring, and rotation force of the motor overcoming elastic force of the spring is transmitted through the wire when the motor is driven, so that the piston is inserted in the cylinder.

Further, the tailgate may be configured so as to rotate through a hinge bracket mounted in the vehicle body and a hinge arm rotatably mounted in the hinge bracket and fixed to the tailgate, and the tailgate further includes a switch of which a button is pressed according to rotation of the hinge arm, the switch being electrically connected with the control module configured to sense whether the tailgate is opened or closed.

Further, a worm may be mounted in a rotation shaft of the motor, and a worm wheel engaged with the worm is mounted in the pulley.

Accordingly, the inner-handle may protrude from the tailgate or return to an original position according to an opening/closing state of the tailgate, so that a user may more easily and conveniently hold the inner-handle regardless of a height of the user without needing to adjust an opening angle of the tailgate.

Since the inner-handle makes the pistons slide through the springs and the cable, even when the tailgate is suddenly closed, the flexible cable may absorb the shock, thereby preventing the motor and/or the types of gear connected with the motor from being damaged.

The switch may be configured so that the button is physically pressed according to the rotation of the tailgate, so that the control module may recognize more rapidly and accurately whether the tailgate is opened or closed.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1A:
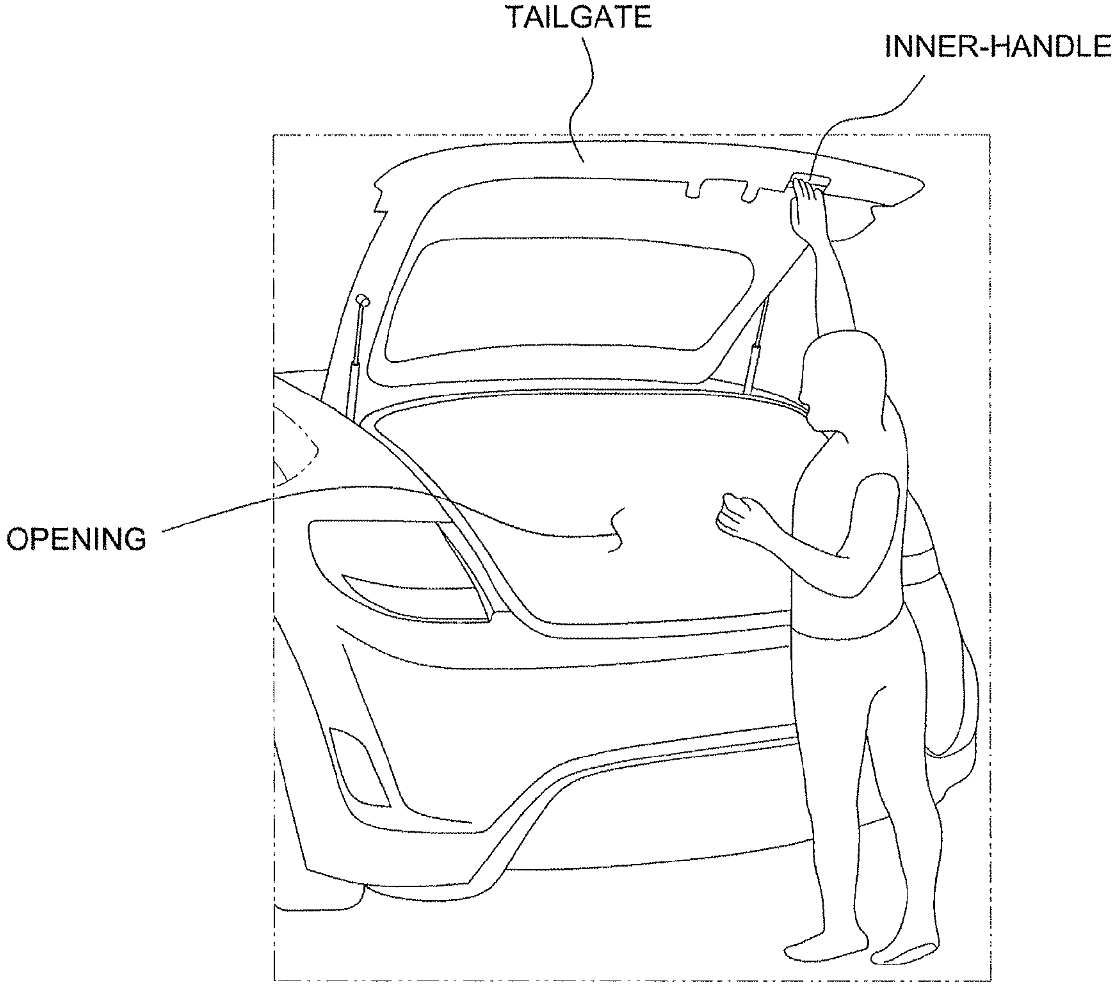
FIG. 1A (Prior Art)
FIGS. 1A and 1B are a picture and a view illustrating a relative height to a tailgate according to a height difference in a state where the tailgate is opened, respectively.
Figure 1B:
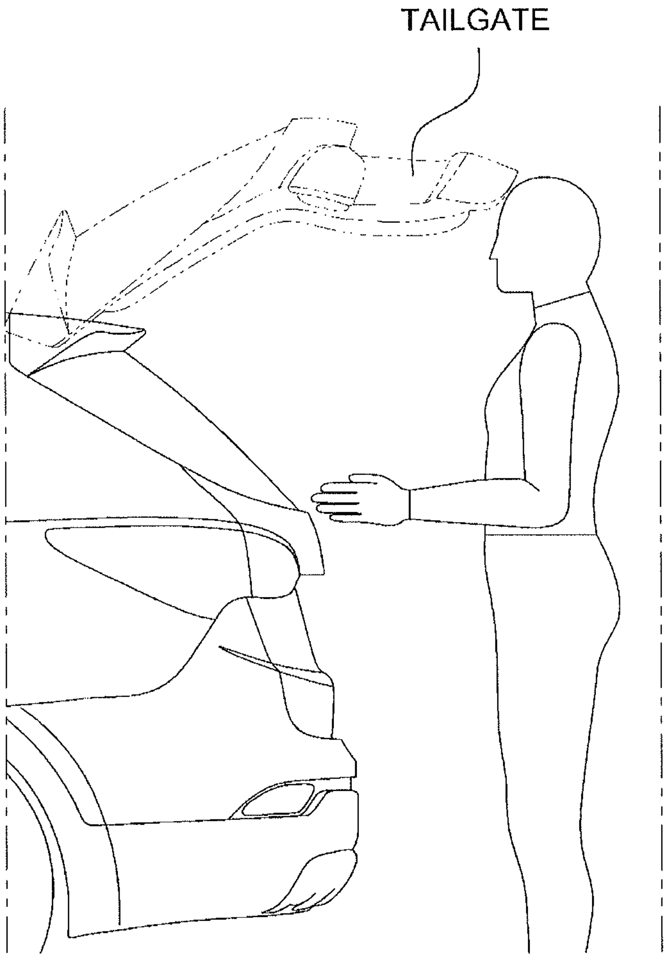
FIG. 1B (Prior Art)
Figure 1C:
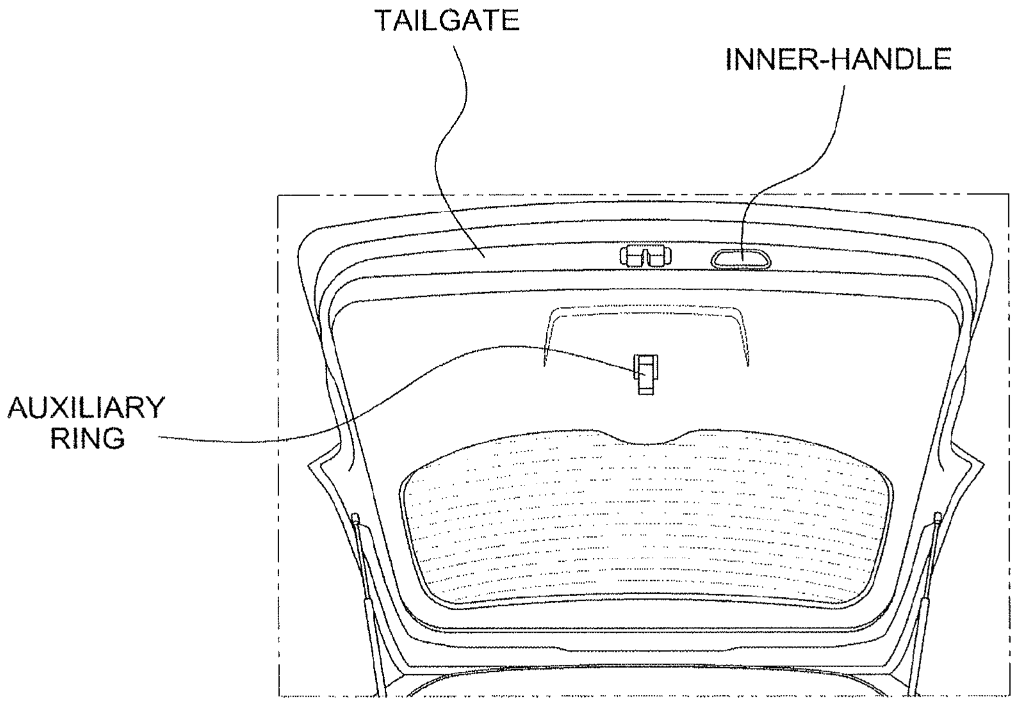
FIG. 1C (Prior Art)
FIG. 1C is a picture showing an auxiliary ring which is mounted in a tailgate in the related art.
Figure 2:
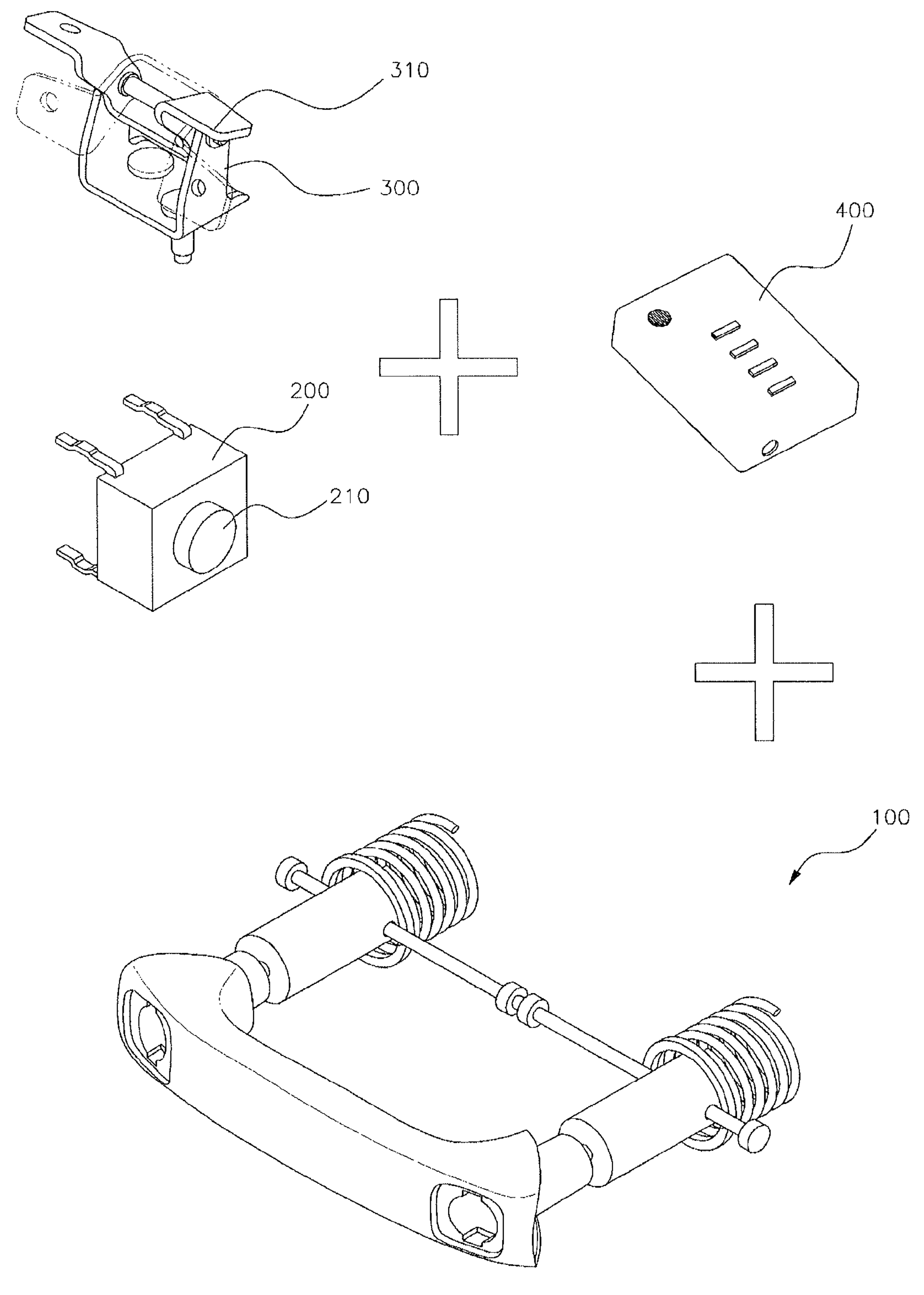
FIG. 2 is a view illustrating constituent elements according to the present invention.

Referring to FIG. 2, a structure of an inner-handle for a tailgate according to the present invention includes an inner-handle 100, and further includes a hinge bracket 300 in which a hinge arm 130 connected to an upper end of the tailgate is rotatably mounted, the hinge bracket 300 being fixed to a vehicle body, a switch 200 including a button 210 pressed against the hinge arm 310 according to rotation of the tailgate, and a control module 400 electrically connected with the switch 200 to detect whether the tailgate is opened or closed and control a motor 60 inside the inner-handle 100.

The control module 400 is configured so as to apply power of a battery of a vehicle to the motor, and may be mounted as a separated component or may be integrated with an electronic control unit (ECU) or a body control module (BCM) of a vehicle.

Figure 3:
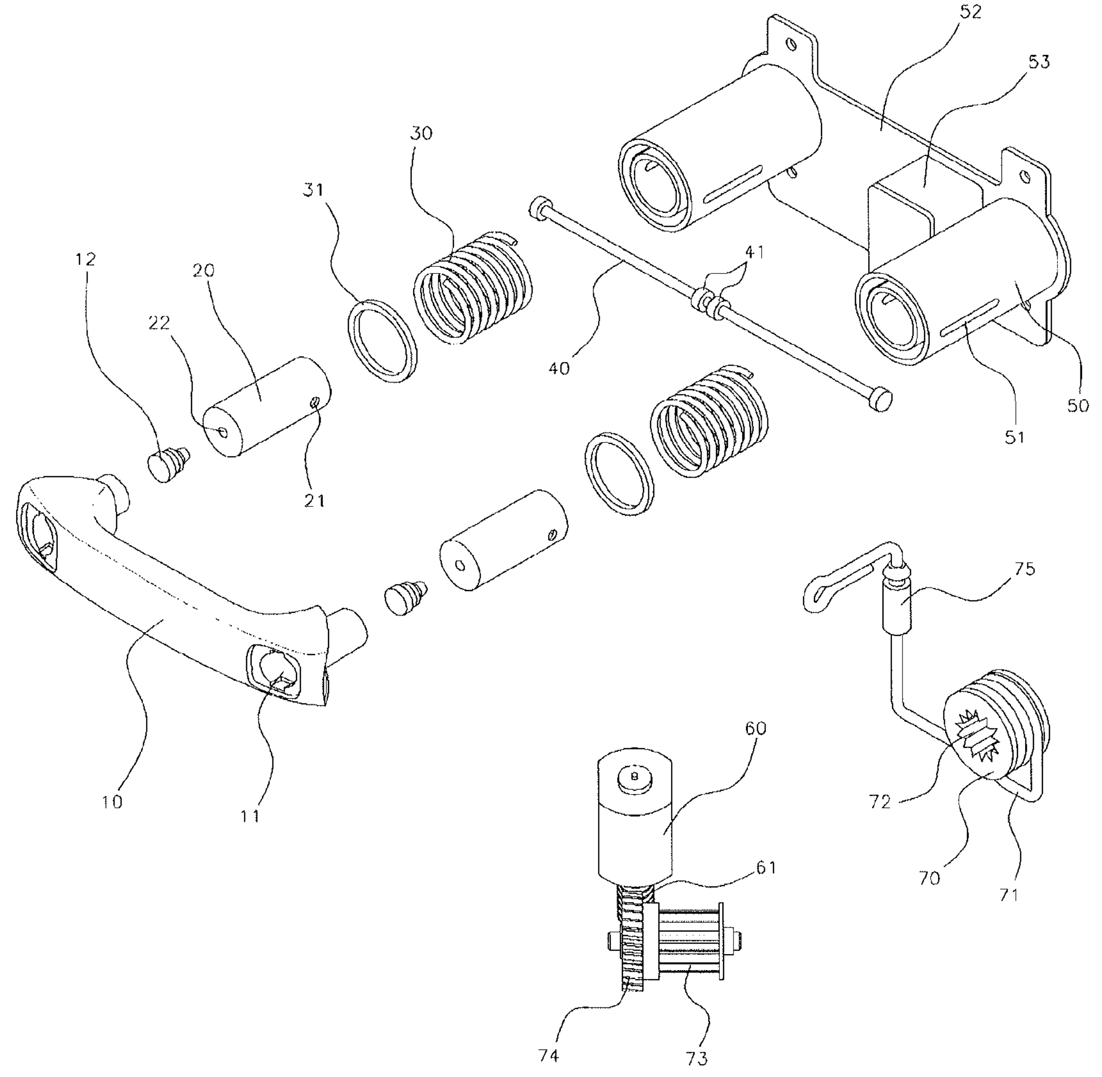
FIG. 3 is an exploded perspective view of an exemplary inner-handle according to the present invention.

FIG. 3 is an exploded perspective view of the inner-handle 100 according to the present invention. Referring to FIG. 3, a motor cover 53 in which the motor 60 is embedded and two cylinders 50 are arranged in a plate 52 fixed to the tailgate (more specifically, a lower-end panel of the tailgate) while being spaced apart from each other in parallel. Sliding holes 51 are punched at both sides of an outer circumferential surface of each cylinder 50 along a longitudinal direction.

Pistons 20 are inserted in the cylinders 50 to make a pair with the cylinders, respectively. A fitting hole 21 is formed at the piston 20 so as to pass through the piston 20 in a lateral direction, and a bolt hole 20 is punched at a distal end of the piston 20. Further, a handle 10 is fixed to the respective pistons 20, and each of one side and the other side of the handle 10 is fixed to the piston 20 through fixing bolts 12 inserted through handle holes 11 into the bolt holes 22.

Further, a carrying bar 40 is mounted between both cylinders 50. A guide member 41 is fitted to the carrying bar so that a wire 71 is positioned at a center, and both distal ends of the carrying bar enter the respective cylinders 50 through the sliding holes 51 to be inserted in or to pass through the fitting holes 21, to be connected to both pistons 20.

The carrying bar 40 may be configured so that the motor 60 capable of rotating and counter rotating may reciprocate directly or by using the types of gear. However, in various embodiments of the present invention, the reciprocation is performed by using the motor 60 and a spring 30 in order to protect a gear and the motor 60 when the tailgate is suddenly closed.

That is, the spring 30 is additionally mounted to each of the cylinders 50, so as to apply elastic force in a direction in which the piston 20 protrudes outwardly from the cylinder 50 through a ring member 31.

Further, the motor 60 embedded in the motor cover 53 is connected to the carrying bar 40 through the wire 71. The wire 71 is wounded around a pulley 70 to be wound around or unwound from the pulley 70 according to rotation force of the motor 60 and elastic force of the spring 30.

The wire 71 is unwound or wound via a guide 75 fixed to the plate 52 so as to move in a longitudinal direction of the cylinder 50, and the pulley 70 includes a second pulley of which an outer circumferential surface is wounded with the wire 71, the second pulley having female gear teeth 72 at a center thereof, and a first pulley including a male gear teeth 73 engaged with the female gear teeth 72 at an outer circumferential surface thereof and including a worm wheel 74 at one side thereof. The worm wheel 74 of the first pulley is configured to be engaged with a worm 61 of the motor 60.

Figure 4:
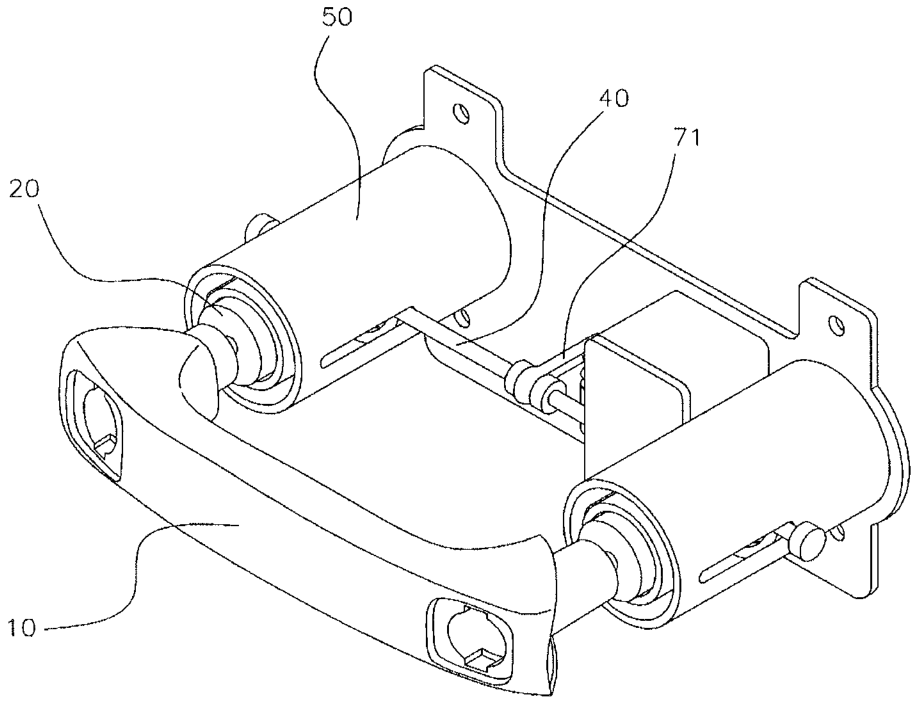
FIG. 4 is a view illustrating an exemplary inner-handle when a piston is positioned at an original position (a position to which the piston returns so as be inserted inside a cylinder).
Figure 5:
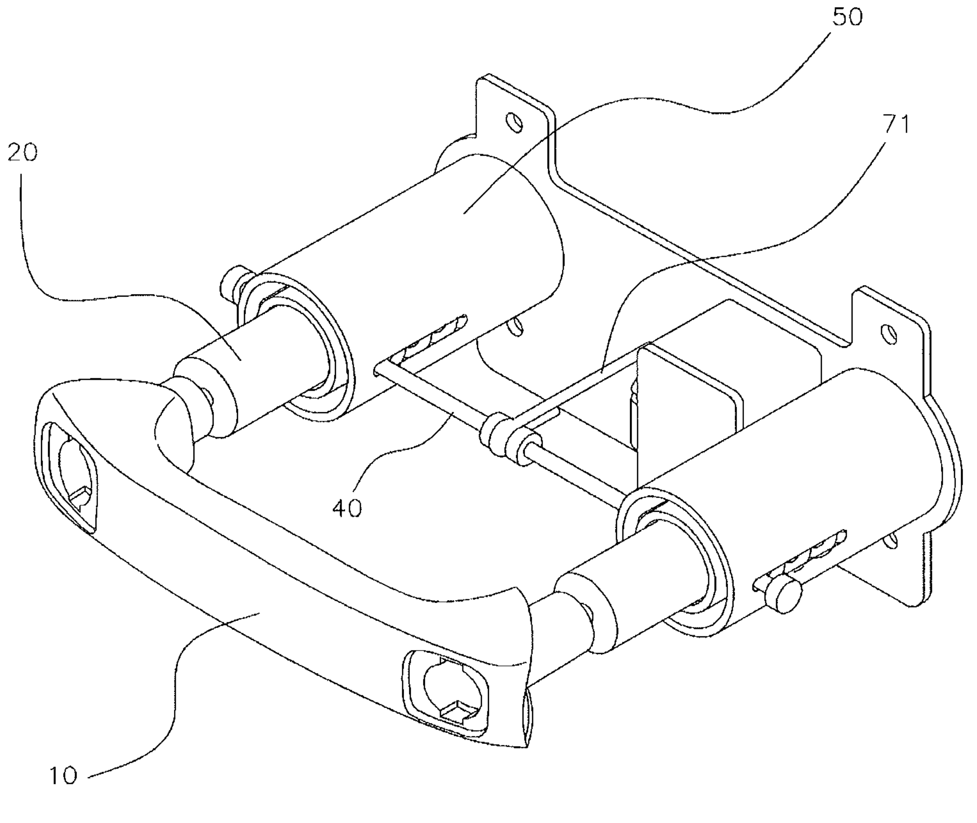
FIG. 5 is a view illustrating an exemplary inner-handle when the piston protrudes.

Accordingly, the piston 20 protrudes from the cylinder 50 by elastic force of the spring 30 as illustrated in FIG. 5, and rotation force of the motor 60 overcoming elastic force of the spring 30 is transmitted through the wire 71 when the motor 60 is driven, so that the piston 20 is operated so as to be inserted in the cylinder 50 as illustrated in FIG. 4.

Further, the driving of the motor 60 is controlled through the control module 400 electrically connected with the switch 200 as described above.

Figure 6:
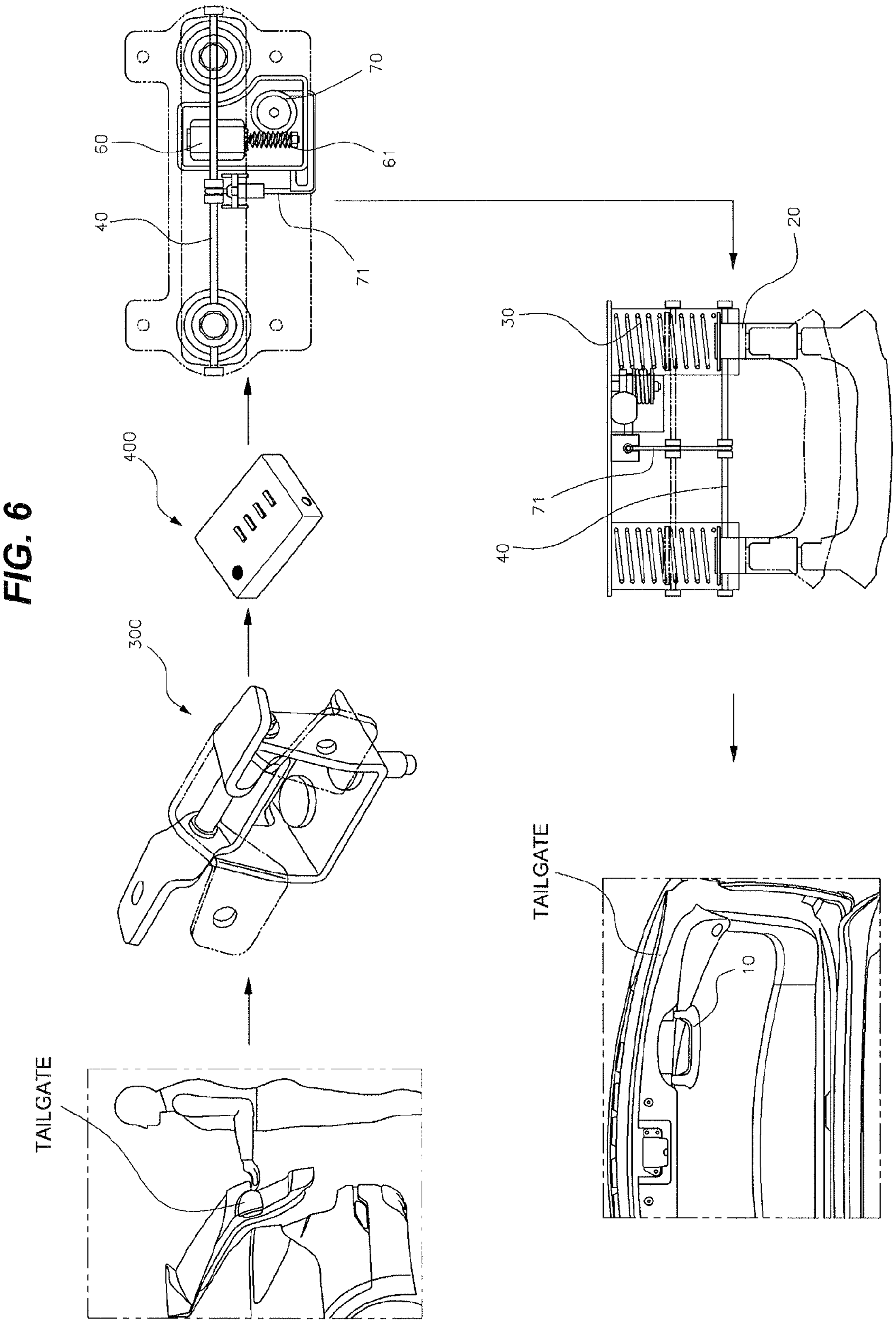
FIG. 6 is a view sequentially illustrating an operation state of an exemplary inner-handle according to opening of the tailgate.
Figure 7:
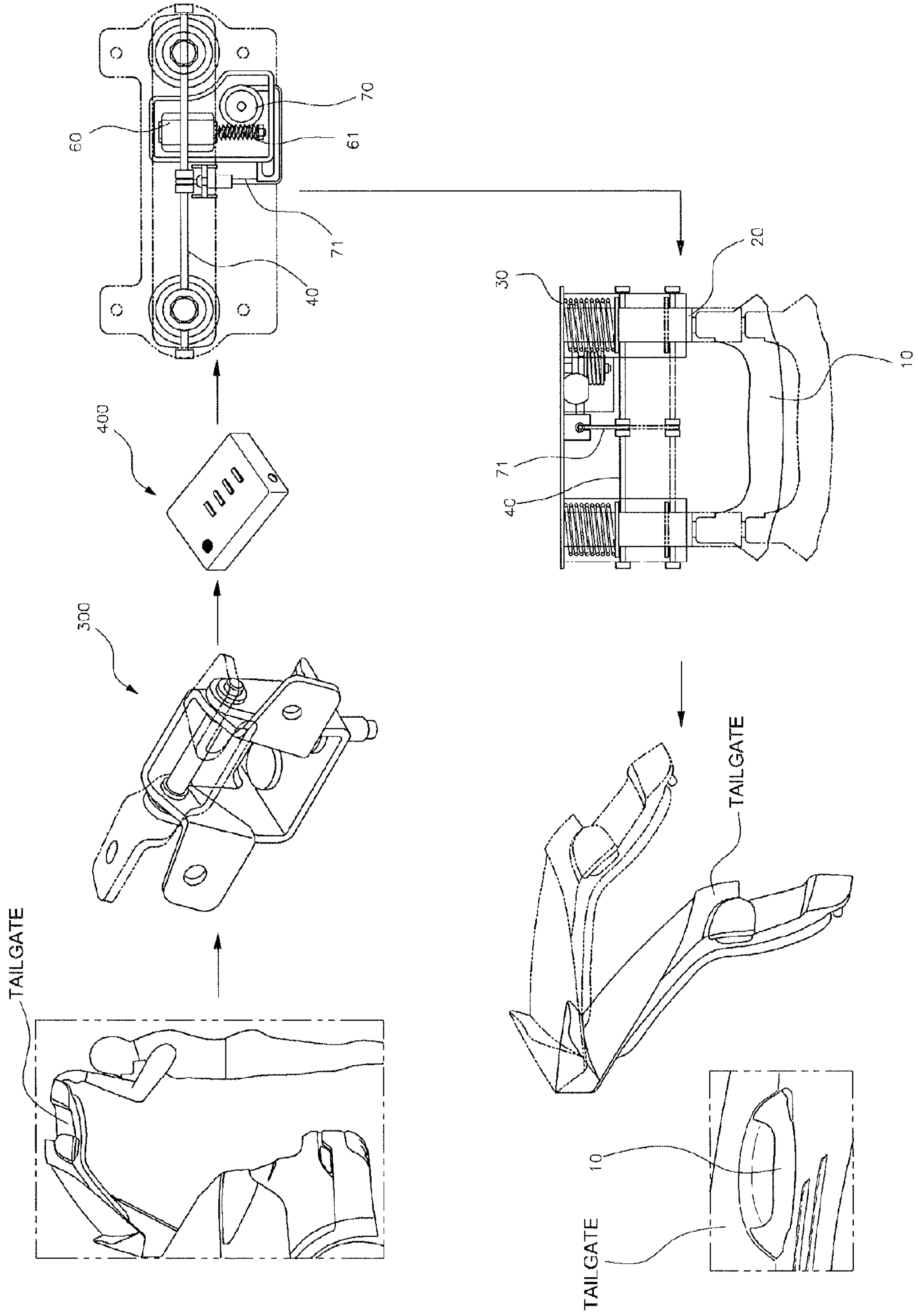
FIG. 7 is a view sequentially illustrating an operation state of an exemplary inner-handle according to closing of the tailgate.

The operation of the inner-handle 100 of the present invention including the aforementioned configuration is illustrated in FIGS. 6 and 7 in more detail.

Referring to FIG. 6, the hinge arm 310 rotates according to the opening of the tailgate and thus the button 210 of the switch 200 pressed against the hinge arm 310 is released. This is sensed through the control module 400. The control module 400 applies reverse rotation power to the motor 60 so that the wire 71 is more rapidly unwound and interference to unwinding of the wire 71 due to the worm 61 and the worm wheel 74 which cannot reversely rotate is prevented.

Accordingly, tension applied to the wire 71 is decreased and the piston 20 protrudes outwardly from the cylinder 50 by elastic force of the spring 30, so that the handle 10 moves to an expanded position.

Then, referring to FIG. 7, the hinge arm 310 also rotates according to the closing of the tailgate, and thus the button 210 of the switch 200 is pressed against the hinge arm 310. This is sensed through the control module 400. The control module 400 makes the motor 600 rotate to overcome elastic force of the spring 30 and winds the pulley 70 with the wire 71. Accordingly, the piston 20 is inserted inside the cylinder 50 and the handle 10 returns to the original position.

In the meantime, when the tailgate is closed suddenly or too quickly, impact is generated to the handle 10 so that the piston 20 rapidly enters the cylinder 50. However, impact is buffered in the wire 71, so that the impact does not affect the motor 60 and the types of gear.

For convenience in explanation and accurate definition in the appended claims, the terms upper or lower, rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A structure of an inner-handle for a tailgate, in which the inner-handle is constructed in the tailgate vertically rotatably mounted at a rear side of a vehicle body, the structure comprising:

cylinders having sliding holes in outer circumferential surfaces of the cylinders along a longitudinal direction of the cylinders;

pistons inserted in respective cylinders and having respective fitting holes;

a handle, wherein each of both sides of handle is mounted at one end of each of the pistons respectively;

a carrying bar entering the cylinders through sliding holes to be inserted in the fitting holes;

a motor connected so as to slide the carrying bar; and a control module configured to apply power to the motor according to when the tailgate is opened or closed.

2. The structure of claim 1, wherein the piston and the cylinder make a pair, two pairs of pistons and cylinders are arranged in parallel so as to be connected to one side and another side of the handle, respectively, and the carrying bar is mounted between the two pairs of pistons and cylinders so that one end of the carrying bar and another end of the carrying bar are connected to the pairs of pistons and cylinders, respectively.

3. The structure of claim 1, further comprising:

springs inserted in the cylinders to apply elastic force in a direction in which the pistons protrude outwardly from the cylinders;

wherein the motor is connected with the carrying bar through a wire which is wound around a pulley and of which one end is bound to the carrying bar, so that the piston protrudes from the cylinder by elastic force of the spring, and rotation force of the motor overcoming elastic force of the spring is transmitted through the wire when the motor is driven, so that the piston is inserted in the cylinder.

4. The structure of claim 2, further comprising:

springs inserted in the cylinders to apply elastic force in a direction in which the pistons protrude outwardly from the cylinders;

wherein the motor is connected with the carrying bar through a wire which is wound around a pulley and of which one end is bound to the carrying bar, so that the piston protrudes from the cylinder by elastic force of the spring, and rotation force of the motor overcoming elastic force of the spring is transmitted through the wire when the motor is driven, so that the piston is inserted in the cylinder.

5. The structure of claim 3, wherein the tailgate is configured so as to rotate through a hinge bracket mounted in the vehicle body and a hinge arm rotatably mounted in the hinge bracket and fixed to the tailgate, and the tailgate further comprises a switch of which a button is pressed according to rotation of the hinge arm, the switch being electrically connected with the control module configured to sense whether the tailgate is opened or closed.

6. The structure of claim 3, wherein a worm is mounted in a rotation shaft of the motor, and a worm wheel engaged with the worm is mounted in the pulley.

* * * * *